United States Patent [19]

Hallman

[11] 3,714,028
[45] Jan. 30, 1973

[54] HIGH TEMPERATURE, HIGH PRESSURE HYDROCARBON CONVERSION PROCESS

[75] Inventor: Newt M. Hallman, Mt. Prospect, Ill.

[73] Assignee: Universal Oil Products Company, Des Plaines, Ill.

[22] Filed: Nov. 23, 1970

[21] Appl. No.: 91,970

[52] U.S. Cl. .................................208/111, 208/85
[51] Int. Cl. ......................C10g 13/02, C10g 13/04
[58] Field of Search.................................208/111, 85

[56] References Cited

UNITED STATES PATENTS 3,132,089  5/1964  Hass et al. .......................208/111 X
3,147,206  9/1964  Tulleners.........................208/111 X
2,985,582  5/1961  Oettinger ............................208/85

Primary Examiner—Daniel E. Wyman
Assistant Examiner—P. F. Shaver
Attorney—James R. Hoatson, Jr. and Edward W. Remus

[57] ABSTRACT

Hydroprocessing is effected by contacting the hydrocarbon with hydrogen in a low pressure, vapor-liquid contacting zone maintained under conditions sufficient to dissolve at least a portion of the hydrogen, with the resultant hydrocarbon liquid containing dissolved hydrogen being passed to a high temperature, high pressure reaction zone.

8 Claims, 1 Drawing Figure

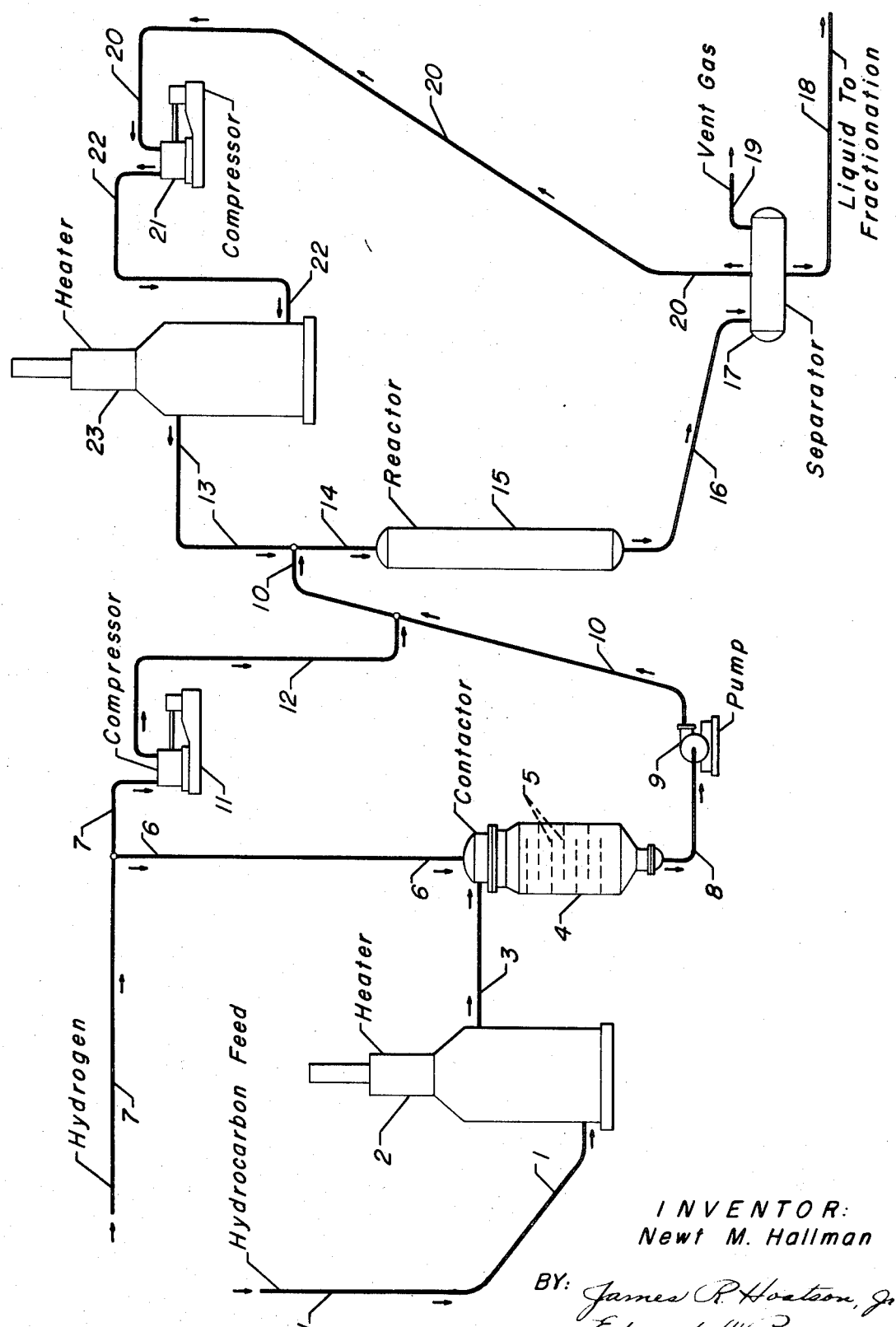

HIGH TEMPERATURE, HIGH PRESSURE HYDROCARBON CONVERSION PROCESS

BACKGROUND OF THE INVENTION

The process of the present invention relates to the conversion of hydrocarbons in the presence of hydrogen at high temperatures and high pressures. More specifically, the process of the present invention relates to the high temperature, high pressure hydrocracking of petroleum distillates or residual oils with decreased hydrogen compression costs.

Hydrocracking, wherein high molecular weight hydrocarbons are converted to lower boiling saturate products, is extensively utilized in the petroleum refining industry. As is well known to those people possessing expertise in this art, hydrocracking requires the presence of considerable amounts of hydrogen at high reaction temperatures and pressures. In these prior arts, a very significant portion of the overall operating costs lies in the compression costs necessary to raise the pressure of the hydrogen to the levels necessary in the process since the hydrogen is typically available only from relatively low pressure sources such as catalytic reformers.

SUMMARY OF THE INVENTION

It is the object of the present invention to provide a more effective high temperature, high pressure hydrocarbon conversion process and, in particular, to provide a high temperature, high pressure hydrocracking process possessing lower hydrogen compression costs than that obtainable in the present art processes.

These objects are accomplished by utilizing the observation that hydrogen is more soluble in liquid hydrocarbons at elevated temperatures and that it is, in general, more economical to pump liquids to a given pressure than to compress gases to the same pressure.

In an embodiment, the present invention relates to an improvement in a process wherein a liquid hydrocarbon is contacted with hydrogen in a high pressure, high temperature reaction zone wherein the hydrocarbon and hydrogen are initially at a relatively low pressure, and are separately raised to the high pressure of the reaction zone. The particular improvement resides in first contacting the hydrocarbon with hydrogen in a low pressure, vapor-liquid contacting zone which is maintained under conditions sufficient to dissolve at least a portion of the hydrogen in the liquid hydrocarbon so as to produce a hydrocarbon liquid containing dissolved hydrogen. This hydrogen containing liquid is then passed to the high temperature, high pressure reaction zone.

In a further embodiment, the process of the present invention relates to a method for hydroprocessing a liquid hydrocarbon at an elevated temperature and pressure by first contacting the hydrocarbon and low pressure hydrogen in a low pressure, vapor-liquid contacting zone maintained under conditions sufficient to dissolve at least a portion of the hydrogen in the liquid hydrocarbon. Produced is a hydrocarbon liquid containing dissolved hydrogen which is passed to a high temperature, high pressure hydrocarbon conversion zone wherein the hydrocarbon is then contacted with additional amounts of hydrogen.

In further, more limited embodiments, the conditions utilized in the low pressure, vapor-liquid contacting zone include a pressure of about 50 psig to about 500 psig, and a temperature of about 300° F. to about 800° F. Preferably, the temperature, pressure and contact time are correlated to produce an essentially hydrogen saturated hydrocarbon. The hydrocarbon conversion conditions are preferably in a temperature range of about 600° F. to about 950° F. and pressure in the range of about 1,000 psig to about 3,500 psig with the additional hydrogen being supplied to provide a total amount of hydrogen of about 500 SCF/BBL to about 50,000 SCF/BBL. The process of this invention is particularly suited to hydrocracking a hydrocarbon stock such as a petroleum based stock having at least 10 percent by volume boiling over 1,050° F. or a distillate boiling within the range of about 400° F. to about 1,100° F.

Other objects, embodiments, and more detailed description of the foregoing objects and embodiments will be found in the following more detailed description of the present invention.

DETAILED DESCRIPTION

The process and improvement of the present invention is applicable where a normally liquid hydrocarbon is hydroprocessed at elevated temperatures and elevated pressures. As used herein, hydroprocessing refers to any processing of a hydrocarbon or petroleum fraction under elevated pressure involving a consumption of hydrogen by the hydrocarbon or petroleum fraction. Further, the terms "elevated temperature," "elevated pressure," "relatively high pressure" and "relatively high temperature" as used herein connote pressures in excess of about 1,000 psig and particularly pressures of about 1,000 psig to about 3,500 psig and temperatures in excess of about 600° F and particularly temperatures of about 700° F. to about 950° F. Thus, hydrocracking involving a substantial reduction (i.e., 50 percent or more) in the molecular size of the charge with hydrogen consumption in the range of 100 to 300 SCF/BBL, hydrotreating involving removal of impurities such as sulfur and nitrogen with little molecular rearrangement or size reduction, or hydrorefining involving hydrotreating and a minor part (i.e., 10 percent or less) of hydrocracking are all included within the generally broad scope of the present invention, with the invention particularly suited to hydrocracking operations.

Hydrocarbons applicable within the scope of the present invention vary widely and include a relatively pure hydrocarbon species, a mixture of hydrocarbons, a contaminant containing hydrocarbon or mixture of hydrocarbons with those hydrocarbons possessing a high solubility for hydrogen being preferred. THus, an isomerization reaction involving alkyl-aromatic hydrocarbons such as the $C_8$ aromatics or paraffinic hydrocarbons such as the $C_4$–$C_7$ alkanes are within the generally broad scope of the present invention. Further, the term liquid hydrocarbon refers to a hydrocarbon which exists in the liquid phase at relatively ambient temperatures and pressures with the normally gaseous hydrocarbons being excluded.

As indicated, the present invention is particularly suited to a hydrocracking operation and applies to the hydrocracking of either petroleum or coal based hydrocarbon stocks. Particularly preferred are petroleum based stocks, whether of a distillate or residual character, such as a stock having at least 10 percent by volume boiling above 1,050° F. or a distillate boiling within the range of about 400° F. to about 1,100° F. Suitable hydrocarbon stocks depend on the product desired (i.e., whether gasoline, jet fuel, heating oil, lube oils, etc.) and include heavy vacuum gas oils, topped crude oils, middle distillates and the like. Also included within the scope of the present invention are black oils characterized as being a heavy carbonaceous material containing asphaltic materials, of which more than 10 percent (by volume) boils above 1,050° F. and which have API gravity at 60° F. of less than 20, such as vacuum tower bottoms and other residuum stocks.

The essence of the present invention lies in absorbing at least a portion of the hydrogen necessary for effecting a hydroprocessing reaction in the hydrocarbon charge stock passed to the reaction. By absorbing the hydrogen in the hydrocarbon, the compression costs and compressor capacity required are lowered since that hydrogen absorbed in the liquid need not be separately compressed to the high pressure of the hydroprocessing reaction. The savings arise because it is less expensive to bring the hydrogen to the hydroprocessing conversion conditions when it is in solution than when in the gaseous phase, since the costs associated with pumping a liquid to elevated pressures is appreciably less than compressing a gas to the same pressure. This is particularly important since the hydrogen typically utilized in hydroprocessing reactions is available at a relatively low pressure. For example, the most common source of hydrogen, a platinum catalyzed reformer, only produces hydrogen in a 100 psig to 300 psig range. Thus, since the hydrocarbon is also available only at a low pressure, both the hydrocarbon and hydrogen must be separately raised to the pressure of the reaction.

This hydrogen absorption into the liquid hydrocarbon is effected by contacting the hydrogen and hydrocarbon in a low pressure, vapor-liquid contacting zone maintained under conditions sufficient to dissolve at least a portion of the hydrogen in the liquid hydrocarbon to produce a hydrocarbon liquid containing dissolved hydrogen. This contacting may be performed by any means known to those trained in the art, such as packed columns, bubble cap tray columns, sieve columns and the like with the hydrogen being contacted with the hydrocarbon in either a countercurrent or cocurrent manner. Likewise, the hydrogen may be simply admixed with the hydrocarbon by mixing in a pipeline or sparging in a closed vessel such as the feed surge drum utilized in a typical high pressure operation.

Suitable contacting zone conditions include a pressure of about 50 psig to about 500 psig and a temperature of about 300° F. to about 800° F. However, it is preferred to utilize temperature levels almost as high as the conversion conditions of the hydroprocessing reaction but just below the incipient level of cracking of the particular hydrocarbon stream being processed, since hydrogen exhibits the unusual property of being more soluble in most hydrocarbon liquids at high temperatures than at low temperatures. Further, it is preferred to correlate the contacting time, contact conditions and hydrogen to hydrocarbon ratios so as to insure essentially complete saturation of the hydrocarbon and almost complete absorption of the hydrogen present. While excess amounts of hydrogen not capable of absorption, because of thermodynamic equilibrium limitations, are readily removed, the presence of considerable amounts of excess unremoved hydrogen may result in two-phase flow to the liquid pumps which can cause cavitation and other malfunctions.

In any event, the resulting hydrocarbon liquid containing dissolved hydrogen is then passed to a high temperature, high pressure reaction or hydrocarbon conversion zone wherein the hydrocarbon is hydroprocessed by methods known to the art and whose exact process function is not necessarily critical to the practice of this invention.

In the conversion or reaction zone, the hydrogen containing hydrocarbon is contacted with an additional amount of hydrogen so as to effect the particular conversion reaction involved. This additional amount of hydrogen is required since it is usually impossible to dissolve all the hydrogen needed, for a particular process, in the hydrocarbon being processed. However, the hydrogen dissolved in the hydrocarbon need not be separately compressed and the costs associated with separately compressing the hydrogen now in solution to the hydrocarbon conversion conditions are eliminated, thus rendering a more efficient, economical process.

The present invention is suited to a high pressure, high temperature hydrocracking operation, particularly a catalytic hydrocracking operation for the conversion of petroleum distillates and crude oil type feedstocks to lower boiling, saturated products.

The catalytic hydrocracking process step in the present invention may be effected in any suitable manner known to those trained in the art, and may comprise either a batch or a continuous type operation. When utilizing a continuous type operation, which is the preferred manner of effecting the hydrocarbon conversion step of the present invention, the catalyst may be disposed as a fixed bed in a catalytic reaction zone maintained under the desired hydrocracking operation conditions. Hydrocarbon feedstocks containing the dissolved hydrogen and the additional amount of hydrogen necessary to effect the reaction are admixed and continuously charged to the hydrocarbon conversion zone and are contacted with the catalyst in either an upward, downward or radial flow fashion. The hydrocarbon conversion operation may also be effected in a moving bed type operation, an ebullating bed operation, or in a hydrocarbon-catalyst suspension type operation in which the catalyst and hydrocarbons are commingled and passed through the reaction zone as a slurry. The preferred method of operation is a fixed bed, downflow system.

The operating conditions to be imposed on the hydrocarbon conversion zone will be dependent to a great extent upon the characteristics of the total charge to be processed, the hydrocarbon conversion reaction to be effected and the desired product quality and product quantity. When effecting a hydrocracking operation the temperature within the reaction zone will be controlled by controlling the temperature of the hydrocarbon hydrogen feed mixture so as to maintain a temperature in the range of about 700° F. to about 950°

F. Further, a pressure in the range of about 1,000 psig to about 3,500 psig will be imposed on the system. The hydrocarbon charge contacts the catalytic composite at a liquid hourly space velocity in the range of about 0.5 hr.$^{-1}$ to about 10 hr.$^{-1}$. The total hydrogen concentration in the reaction zone, which includes the hydrogen dissolved in the hydrocarbon in the initial low pressure vapor-liquid contacting zone and the additional amount of hydrocarbon commingled with the liquid hydrocarbon feedstock, will be in the range of about 500 to 50,000 SCF/BBL (standard cubic feet per barrel). Preferred total hydrogen concentrations are in the range of about 2,000 to about 10,000 SCF/BBL. If the particular hydroprocessing reaction is a hydrotreating or hydrorefining reaction, the conditions utilized will usually be less severe than those utilized in a hydrocracking operation.

The preferred method of effecting a hydrocracking operation comprises raising the liquid hydrocarbon charge containing dissolved hydrogen to a temperature just below the incipient level of cracking, and preferably a temperature within the range of about 700° F. to about 800° F. if the hydrocarbon is not at that temperature already. In a separate heater, the hydrogen stream which supplies the additional hydrogen needed in the hydrocracking reaction is heated to a temperature above that at which thermocracking of hydrocarbons occurs. For example, the hydrogen will be separately heated to a temperature within the range of about 900° F. to about 1,000° F. or higher. The thus separately heated streams are then admixed prior to introduction into the reaction chamber. A particularly preferred technique comprises introducing the separately heated streams into a common mixer-header wherein sufficient turbulence is generated to assure through contact and complete heat exchange between the two streams prior to introduction into the reaction chamber.

The exact catalytic composite to be utilized in a catalytic hydroprocessing reaction is, as in the case of the conversion conditions, a function of the particular reaction desired and feedstock utilized. Generally, however, these catalysts can be characterized as comprising a metallic component having hydrogenation activity, which component is usually composited within a refractory inorganic oxide material of either synthetic or natural origin. When effecting a hydrocracking operation, it is preferred to utilize a refractory inorganic oxide of acidic nature. It is preferred to utilize such catalysts where a metallic component is combined with a carrier material but it is within the scope of the present invention to include situations where a metallic component is unsupported such as in the previously mentioned slurry operation.

Suitable metallic components having hydrogenation activity are those selected from Groups VIB and VIII of the Periodic Table of Elements. Thus, a catalytic composite may comprise one or more metallic components selected from the group consisting of chromium, molybdenum, tungsten (wolfram), iron, cobalt, nickel, ruthenium, rhodium, palladium, osmium, iridium and platinum. The concentration of the catalytically active metallic component or components is primarily dependent upon the particular metal involved, process utilization and characteristics of the hydrocarbon charge stock. The metallic components of Group VIB are preferably present in amounts within the range of about 1 to about 50 percent by weight, the iron group metals of Group VIII in an amount within the range of about 0.2 percent to about 10 percent by weight, whereas the platinum group metals are preferably present in an amount within the range of 0.1 to about 5 percent by weight, all of which are calculated as if the components existed as the elemental metal.

Refractory inorganic oxide carrier materials may comprise alumina, silica, zirconia, magnesia, titania, boria, strontia, hafnia, etc; the crystalline aluminosilicates such as mordenite, faujasite, etc., and mixtures of two or more of these materials including silica-alumina, silica-zirconia, alumina-mordenite, alumina-silica-faujasite, and the like. The precise composition and method of manufacturing of the carrier material is not essential to the present invention. Preferred carrier materials include faujasite and those containing at least a portion of silica and preferably, a composite of alumina and silica containing a greater proportion of alumina. Particularly preferred is a catalyst comprising about 2 to about 10 percent by weight, nickel on a faujasite base.

DESCRIPTION OF THE ATTACHED DRAWING

The process of the present invention can be most clearly described by reference to the attached drawing schematically illustrating a hydrocracking type operation. Of necessity, certain limitations must be present in a diagram of the type presented and no intention is made thereby to limit the scope of this invention to particular reactants, concentrations, weights, operating conditions, catalysts, etc. Miscellaneous appurtenances including some valves, pumps, compressors, separators, reboilers, etc., have been eliminated. Only those vessels and lines necessary for a complete and clear understanding of the process of the present invention are illustrated, with any obvious modification made by those possessing expertise in the art of hydroprocessing being included within the generally broad scope of the present invention.

Referring now to the schematic diagram, a hydrocarbon feedstock such as vacuum tower bottoms having a normal boiling point of about 1030°F. and an API gravity at 60° F. of about 13.3, enters the process via line 1 and is passed to heater 2. Within heater 2, the hydrocarbon feed is heated to a temperature of about 300° F. to about 800° F. and is removed therefrom via line 3 and passed to vapor-liquid contactor 4.

Vapor-liquid contactor 4 is a vapor-liquid contacting means of a design well known to those trained in the art, and containing spaced baffle means 5 to insure adequate mixing and contact between the heated hydrocarbon and hydrogen. Within contactor 4, the heated hydrocarbon feed and hydrogen, entering via line 6, are intimately admixed at a pressure of about 50 to 500 psig. More specifically, make-up hydrogen enters the process via line 7 and is derived from a conventional platinum catalysed catalytic reformer and is at a pressure of about 200 psig. A portion of this hydrogen is removed from line 7 via line 6 in an amount sufficient to saturate the hydrocarbon feed with essentially all of the hydrogen passed to contactor 4 being absorbed.

The thus produced hydrogen saturated hydrocarbon is removed from contactor 4 via line 8 and pumped, via pumping means 9 through line 10 to hydrocracking reactor 15. The additional amount of hydrogen needed to effect the hydrocracking reaction over that supplied by recycle is supplied by compressing hydrogen in line 7 via compression means 11 to the pressure of reactor 15. This compressed hydrogen passes from compressor 11 via line 12 and is commingled in line 10 with the hydrogen saturated hydrocarbon from contactor 4. This mixture is passed via line 10, commingled with heated recycle hydrogen, the source of which to be described later, entering via line 13 and the thus produced two-phase hydrogen-hydrocarbon system is passed through line 14 to hydrocracking reactor 15. This hydrocracking reactor contains a fixed bed of hydrocracking catalysts through which the hydrocarbon feed and hydrogen are contacted in a downflow fashion. Reaction conditions within reactor 15 include a pressure of about 1,000 psig to about 3,500 psig and a temperature of avout 700° F. to about 950° F. The total amount of hydrogen absorbed by the hydrocarbon in contactor 4 and the additional amount entering via lines 12 and 13 is such as to provide a total hydrogen concentration of about 500 SCF/BBL to about 50,000 SCF/BBL, and preferably in a range of about 2,000 to about 10,000 SCF/BBL.

Removed from reactor 15 via line 16 is a reaction product effluent which is passed to high pressure separator 17, which is maintained at approximately the same pressure and temperature as utilized in reactor 15. The vapor and liquid phases present in reactor 15 effluent are separated in separator 17 and the liquid is removed therefrom via line 18 for further fractionation and product recovered by means well known to those trained in the art. Removed as vapors from separator 17, via line 20, is a recycle hydrogen stream which comprises the majority of the hydrogen not consumed in the hydrocracking reactor and vent gas stream 19. This recycle hydrogen stream 20 is compressed to the pressure of reactor 15 by compression means 21 and passed via line 22 to heater 23. Within heater 23, the hydrogen is heated to a temperature level so that when this hydrogen is commingled with the hydrocarbon feedstock, the resulting two-phase mixture is at the desired inlet temperature to reactor 15. This heated hydrogen is removed from heater 23 via line 13 and commingled with hydrocarbon feed in line 10 and passed to reactor 15 via line 14 as previously described.

From this foregoing description, it is readily apparent to those trained in the art that by absorbing a portion of the hydrogen needed in reactor 15 in vapor-liquid contactor 4, lesser amounts of hydrogen need be compressed in compressor 11 thereby resulting in a more efficient high temperature, high pressure hydroprocessing process than heretofore has been obtainable in the art.

I claim as my invention:

1. A process for the conversion of a hydrocarbon liquid by reaction with hydrogen which comprises physically dissolving a substantial portion of said hydrogen in said liquid at a temperature of about 300° F. to about 800° F. and a pressure of about 50 to about 500 psig., commingling the remainder of said hydrogen with the resultant solution of hydrogen in hydrocarbon liquid, and subjecting the mixture to conversion at a pressure of about 1,000 psig to about 3,500 psig and a temperature of about 700° F. to about 950° F.

2. The process of claim 1 further characterized in that said liquid is saturated with hydrogen at the first-mentioned temperature and pressure.

3. The process of claim 1 further characterized in that said conversion is hydrocracking.

4. The process of claim 1 wherein said hydrocarbon is a petroleum based stock having at least 10 percent by volume boiling above 1,050° F.

5. The process of claim 1 wherein said hydrocarbon liquid is a distillate boiling within the range of about 400° F. to about 1,100° F.

6. The process of claim 1 wherein said remainder of the hydrogen is supplied in an amount to provide a total of about 500 SCF/BBL to about 50,000 SCF/BBL.

7. The process of claim 1 wherein said conversion is in contact with a catalyst comprising at least one metallic component selected from the metals of Group VIB and VIII of the Periodic Table combined with an acidic refractory inorganic oxide support.

8. The process of claim 7 wherein said catalyst comprises about 2 to about 10 percent, by weight, nickel on a faujasite base.

* * * * *